United States Patent [19]

David

[11] Patent Number: 4,561,131
[45] Date of Patent: Dec. 31, 1985

[54] DUAL FLUSH TOILET FOR WATER SAVING

[76] Inventor: Constant V. David, 4952 Field St., San Diego, Calif. 92110

[21] Appl. No.: 669,338

[22] Filed: Nov. 8, 1984

[51] Int. Cl.[4] .............................................. E03D 1/14
[52] U.S. Cl. .......................................... 4/326; 4/324; 4/415; 4/425
[58] Field of Search ............................ 4/300, 324–326, 4/345–346, 353–354, 378–379, 415, 421, 425; 137/624.11, 624.12; 251/175

[56] References Cited

U.S. PATENT DOCUMENTS

| | | | |
|---|---|---|---|
| 881,333 | 3/1908 | Palmer et al. | 4/425 |
| 1,933,518 | 10/1933 | Zwermann | 4/425 |
| 2,101,991 | 12/1937 | Finley et al. | 251/175 |
| 3,788,593 | 1/1974 | Cohen | 137/624.11 |
| 3,843,978 | 10/1974 | Ragot | 4/425 |
| 3,984,878 | 10/1976 | Grasseschi | 4/425 |
| 4,086,668 | 5/1978 | Tubbs | 4/425 |
| 4,462,124 | 7/1984 | Antos et al. | 4/346 |
| 4,504,984 | 3/1985 | Burns | 4/324 |

*Primary Examiner*—Charles E. Phillips
*Assistant Examiner*—Linda J. Sholl

[57] ABSTRACT

A water saving apparatus for water conservation which is achieved by minimizing the amount of water required to flush a toilet effectively. A specially configured toilet bowl is combined with a small toilet tank which houses two independent flushing systems. They can be operated singularly, simultaneously or in sequence selectively, depending upon the degree and type of flushing deemed most appropriate by an operator for the occasion. The functions of expelling waste matter present in the toilet bowl and of washing the internal surface of the toilet bowl are separated and each function is performed by the flushing system deemed most effective to accomplish the task, and each task is completed with a minimum amount of water being required for this specific task. The operator alone selects which flushing mode is to be used and retains control of the proper flushing sequence. The operator then is the sole judge as to the extent of water saving that is justified. Protection is built in to prevent unnecessary wasteful flushing cycles, often initiated by small children in a playful manner.

18 Claims, 9 Drawing Figures

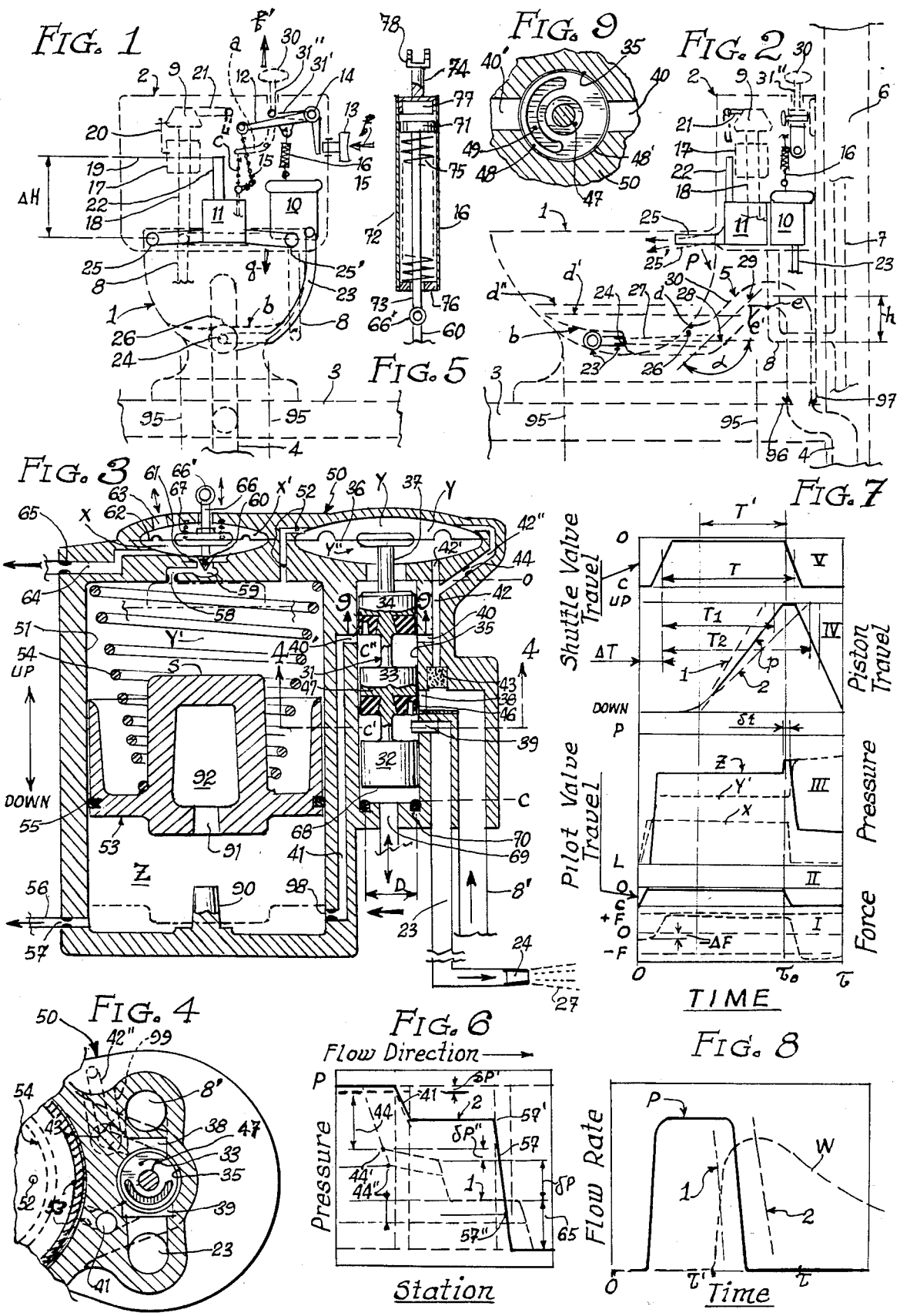

DUAL FLUSH TOILET FOR WATER SAVING

BACKGROUND OF THE INVENTION

The present invention generally relates to an improvement in toilets and, more particularly, is concerned with an apparatus and an approach for minimizing the amount of water expended in the toilet bowl flushing operation. The effectiveness of the toilet bowl flushing is also enhanced. This is achieved by means of a dual-cycle flushing arrangement in which each cycle can be optimized, and operated independently and selectively.

For several decades, toilets have been constructed and arranged so that the toilet bowl, the flushing water tank and the flush valve constitute a compact assembly, easy to install and pleasing to the eyes. Decades ago also, the urban population was smaller, the amount of water needed for non-residential use was lower, the natural water supply was less polluted and more than adequate to satisfy the needs for potable water of all urban populations, although such potable water was used in many applications that do not require potable water, such as gardening. Residential dwellings were then built and equipped with only one single water supply system providing only potable water, whatever its use was intended by the dwelling residents. Water conservation was not important then. However, residential dwellings will still be developed on the basis of one single water supply for a long time to come, for economics reasons.

During these past decades, three interrelated phenomena became more and more obvious: (1) urban populations exploded in the so-called sunbelt regions where water is most scarce; (2) the demand for industrial-use water is constantly accelerating; and, (3) a concomitant increase in the degree of pollution of natural water sources is taking place. In some parts of the sunbelt area (Arizona and Southern California especially), the water situation is foreseen as becoming rapidly very critical. Every attempt to conserve potable water should be made, which means that all excessive usage of potable water should be curbed. It is commonly agreed that one such excessive usage of potable water results from the flushing of toilet bowls, which in most instances is entirely unwarranted.

New toilet tanks have been designed and are now installed with water conservation in mind. They are smaller and equipped with devices conceived to save water and to render the flushing water more effective. This constitutes steps in the right direction and clearly points out the current trend. However, such trend needs be pushed steps further: (1) the amount of water can and must still be reduced during each flushing cycle by making the flushing operation more efficient; and (2) the amount of water and its usage mode can and should be made more appropriate for the specific task intended.

SUMMARY OF THE INVENTION

It is therefore a primary object of the present invention to provide a toilet that is equipped with two flushing systems, each system being constructed so as to optimize and adapt its operation according to the flushing task required.

It is another object of the present invention to provide a toilet that incorporates two distinctly separate and independent systems: (1) one for the efficient expulsion of the waste matter to be evacuated, and (2) another for the efficient washing and cleaning of the toilet bowl wall internal surface, only if and when needed.

It is still another object of the present invention to provide a toilet in which the waste matter expulsion task is performed by the action of a high pressure water jet near the bottom of the toilet bowl and entering the water trap, thereby generating an very effective jet pump effect.

It is still another object of the present invention to provide a toilet in which the toilet bowl is constructed so as to minimize the dead volume of water residing at its bottom and required for the operation of the water trap.

It is still another object of the present invention to provide a toilet in which the toilet bowl wall internal surface is rinsed with water introduced at low velocity under low pressure.

It is still another object of the present invention to provide a toilet in which the initiation, activation and control of the high pressure water flushing are selectively and independently applied by the toilet operator.

It is still another object of the present invention to provide a toilet in which the initiation, activation and control of the low pressure water flushing are selectively and independently applied by the toilet operator.

It is still another object of the present invention to provide a toilet in which the selection and operation of either or both flushing systems are achieved by means of one single activating mechanism.

It is still another object of the present invention to provide a toilet in which both flushing systems, their activation and control mechanisms are part of and contained within the confines of the toilet.

It is still another object of the present invention to provide a toilet in which the sequencing of the activation of each flushing mode can be timed and controlled by the operator for maximum effectiveness and resulting water saving.

Accordingly, the present invention provides a toilet that saves and conserves water by increasing its flushing effectiveness in a manner such that the economy of water more than compensates for the added complexity and cost of the improvements.

DESCRIPTION OF THE DRAWINGS

FIG. 1 is a simplified diagrammatic frontal elevational view of a toilet showing a typical arrangement of the high and low pressure flushing systems.

FIG. 2 is a simplified diagrammatic side elevational view of the toilet arrangement shown in FIG. 1.

FIG. 3 is a diagrammatically-arranged midsectional view of the high pressure automatic flush valve.

FIG. 4 is a true partial sectional view taken along section line 4—4 of FIG. 3.

FIG. 5 is a midsectional elevational view of the step action spring assembly that connects the flushing activating handle to the high pressure automatic flush valve.

FIG. 6 is a diagram illustrating how the water pressure varies between restricting orifices as water flows through the two servoflow channels.

FIG. 7 is a diagram illustrating the temporal positions of various moving parts of the high pressure automatic flush valve and showing the relative values of the pressures and forces acting on its piston.

FIG. 8 is a diagram showing how the motion of the piston of the high pressure automatic flush valve influences the total amounts of water expended during a typical flushing cycle.

FIG. 9 is a sectional view taken along line 9—9 of FIG. 3.

DETAILED DESCRIPTION OF THE INVENTION

Referring to FIGS. 1 and 2, the apparatus consists of a typical toilet bowl 1 and toilet tank 2 secured to a floor 3. Toilet bowl 1 is connected to waste evacuating duct 4 by water trap 5 and located in wall 6. The high pressure water needed for flushing is provided by water pipe 7 located in wall 6 and connected to inlet pipe 8 to both shutoff valve 9 and high pressure automatic flush valve 10. Gravity flush valve 11 and high pressure automatic flush valve 10 are both actuated by lever arm 12 actuated by knob 13 used to activate the flushing. Lever arm 12, articulation 14 and push knob 13 are guided by and secured to toilet tank 2 structure. Chain link 15 connects lever arm 12 directly to flush valve 11 and extensible linkage 16 connects lever arm 12 to high pressure automatic flush valve 10. Float 17 guided by stem duct 18 regulates water level 19 in the toilet tank and is connected to shutoff valve 9 by slip link 20. Shutoff valve 9 discharge tube 21 is shown emptying in overflow tube 22 which is secured to the seat stucture of flush valve 11.

For ease of understanding and clarity, only the outlines of gravity flush valve 11 and high pressure automatic flush valve 10, the components needed for their operation and directly connected to both valves, and their discharge ducting are shown in solid lines. All other parts and components are shown in phantom lines. High pressure automatic flush valve 10 discharges through duct 23 into injection nozzle 24 located at the bottom of toilet bowl 1. Flush valve 11 discharges through two tubes 25 and 25' almost symmetrically positioned inside and at the top of toilet bowl 1. Nozzle 24 is positioned to face the inlet 26 of trap 5 and in a manner such that water jet 27 exiting from nozzle 24 enters inlet 26 along its axis 28. The angle $\alpha$ made by axis 28 and centerline 29 of ascending side 30 of trap 5 is as large as the configuration of the toilet bowl and toilet tank assembly allows. An alternate way to actuate lever arm 12 is illustrated in phantom lines and consists of a pull knob 30 connected by rod 31" to lever arm 31' that is affixed on the same axle as lever arm 12, in which instance push knob 13 would not be used, when the toilet configuration includes only one single knob for activating the flushing operation.

In FIG. 3, the high pressure automatic flush valve consists of a shuttle valve 31 incorporating three co-axially and rigidly connected pistons 32, 33 and 34 sliding in and guided by the cylindrical surface of bore 35, and connected to diaphragm 36 by stem 37. Bore 35 has four openings cut into its surface: opening 38 through which the flow from high pressure duct 8' can discharge, opening 39 through which high pressure water incoming through opening 38 can exit, opening 40 through which high pressure water can also exit and opening 40' through which water coming from opening 40 can leave by means of channel 41. Opening 40 is connected to the high pressure water supply out from duct 8' through channel 42 that is equipped with an easily accessible and removable filter 43. Channel 42 splits into two branches 42' and 42" which connect to chamber volumes Y" and Y respectively, located on the two sides of diaphragm 36. Channel branch 42" contains fixed restricting orifice 44. Pistons 33 and 34 are equipped with a circular sliding seal 46 mounted on and retained by core 47 of both pistons. Seal 46 has a flexible lip 48, limited to one half-side of its external circumference, on which water high pressure can be applied. The other half-side of circular seal 46 is solid. Semi-circular groove 49 thus presents a crescent-shaped outline when viewed in the direction of pistons 33 and 34 common axis as illustrated in FIG. 9. When lips 48 are in front of openings 39 and 40', these openings being then in fact closed, they seal these two openings. Piston land 48' and piston 32 guide the shuttle valve assembly 31 and transmit the lateral forces exerted on it directly to bore 35 wall. In FIG. 3, ducts 8' and 23 are represented as located in the same sectional plane for ease of illustration. Their correct positions correspond to the true illustration of FIG. 4, and are located on opposite sides of bore 35. The centerlines of ducts 8' and 23 are located in a plane perpendicular to that of the section shown in FIG. 4. Volume Y is connected to volume Y' located in the upper section of cylinder 51 by channel 52.

Cylinder 51 contains a piston 53 pushed by spring 54 and equipped with sliding seal 55. Piston 53 can slide freely from one end of cylinder 51 to the other, when actuated by the forces that result from hydraulic pressures, friction and spring 54 reaction. The bottom volume Z of cylinder 51, below piston 53, is vented to channel 41 and exit channel 56 which contains fixed restricting orifice 57. Volume Y' located above piston 53 is vented through channel 58. Channel 58 connects to valve chamber 59 where pilot valve 60 opens or closes valve seat orifice 61. Pilot valve 60 is actuated by flexible diaphragm 62 located between two chambers, the lower identified as X and the upper being connected to the outside by vent hole 63. Volume X is connected to the outside by channel 64 fitted with an externally accessible, removable and adjustable restricting orifice 65. Diaphragm 62 supports both valve 60 and sliding stem 66 fitted with articulation 66' on its upper end. Diaphragm 62 is normally pushed down by compression spring 67 in order to keep orifice 61 normally closed tight. Chambers Y' and Z do not directly communicate at any time. Shuttle valve 31 in FIG. 3 is shown at its mid-travel position. Also, because in its preferred embodiment the high pressure automatic flush valve is illustrated with all moving parts reciprocating up and down, the terminology "up", "down", "upward", "downward", "upstroke" and "downstroke" is used hereinafter to qualify the direction of these parts motion or their relative positions.

Referring now to FIG. 4, it can be seen that openings 38 and 39 can be positioned to be almost diametrically opposed in order to minimize the total travel of shuttle valve 31. These openings cut into the wall of bore 35 can also easily be shaped to have rectangular cross-sections so that, again, the needed shuttle valve displacement can be made even smaller for a given opening venting area. The closing and sealing of openings 39 and 40' by lips 48 insures that, normally, no water leaks through channel 41. Then, shuttle valve 31 is down and piston 32 lower face 68 rests on seal 70 and no water can leak out through vent hole 69. Thus, when the high pressure automatic flush valve is not operating, no leak from the high pressure water supply to the outside (internal volume of the toilet tank) can occur. Then valve 60 is closed and seal 55 prevents water from leaking from volume Y which is permanently connected to water supply pipe 8'. High pressure automatic flush valve 10 body 50 is then sealed tight. It houses all moving parts and components therein.

In FIG. 5, the details of extensible linkage 16 are illustrated. Said linkage consists of a piston-type plunger 71 which can freely move axially inside cylinder sleeve 72. Plunger 71 is affixed to stem 73 and cylinder sleeve 72 is mounted on rod assembly 74. A compression spring 75 is located between plunger 71 and sleeve 72 end closure 76, located around stem 73. At rest, plunger 71 rests against upper end closure 77 of sleeve 72. In that position, the push force of spring 75 is larger than that which is exerted by spring 67 for reasons made clear in the following section of the present specification. Stem 73 is terminated by the complement of articulation 66' which is attached to pilot valve stem 66 earlier described. Rod assembly 74 is terminated by fork articulation 78 which is attached to lever arm 12 as illustrated in FIG. 1.

Referring now to FIGS. 6 through 8, graphs are used to depict graphically the operation of high pressure automatic flush valve 10. Said operation is described and discussed below.

DISCUSSION AND OPERATION

As characteristic of household equipments and appliances, several of their features are of prime importance. The first is the acquisition cost. For a toilet, this selection criterion is of a highly subjective nature. It should not be considered at this juncture. However, another cost can be analyzed objectively: the operation cost over the equipment lifetime. It consists of two items: (1) the cost of water, and (2) the maintenance cost. The next features of interest are: reliability, effectiveness, safety, ease of operation and finally the water conservation aspect. The last feature is also of a highly subjective nature. However, it is somewhat related to the cost of water now, and more importantly, in the future. Thus, they are hereinafter discussed as one single aspect of the improvement potential.

The cost of potable water in Southern California, for instance, at present is about $1.00 per thousand gallons. If 2 gallons are saved per toilet flushing cycle on the average, 6 times a day per toilet, the total amount of potable water so saved is 4,380 g/yr. The water cost saving per unit and per year is then $4.38. For an assumed lifetime of 25 years, the total potential saving is $109.50/unit, assuming that the already existing water shortage does not drastically worsen and that a concomitant dramatic increase in cost of potable water does not materialize, which will very likely happen though by year 2000 or sooner. Such a potential saving is too small to justify the replacement of an old toilet. For those, water conservation is rather the issue to be considered.

However, for new installations, a more thorough examination of the true cost saving is warranted. If one assumes an increase in cost of potable water of 5% per year above any amount of inflation, at the end of the 25th year, the total cost saving is $209.04. With an average cost increase of 10%/yr above inflation, the total saving over 25 years is $431.43. This represents a true saving in non-inflated dollars and the return on such savings over these 25 yrs is not even factored in. The real saving is potentially appreciable. The question is then: what would be the cost of an improvement that could yield such saving? This will be answered later, but it should less than $100.00. Thus, water saving considerations, when installing a new toilet for residential use are worthwhile, assuming that the other features of reliability, safety and ease of operation remain unaltered, and that the maintenance cost is not affected. At this juncture, the toilet role and operation must be analyzed.

A toilet normally performs the function of evacuating human organic waste. However, oftentimes it is used to dispose of such matters as cigarettes butts, soiled cleaning tissues, etc. . . , which may either float or sink in the toilet bowl. In the usual toilet, up to 5 gallons of potable water may be wasted in one flush, just to evacuate a small amount of non-organic matter. No way is currently available to limit this amount of wasted water to the amount that is more than adequate for the task. In addition to evacuating any foreign matter residing in the toilet bowl, a large portion of the flushed water is used to wash, clean and rinse the internal surface of the wall of the toilet bowl during each flushing cycle. That function is necessary only for a small fraction of the total number of flushes needed during the lifetime of a toilet. It thus appears that the matter evacuating function per se and the toilet bowl wall cleaning function should be considered as two separate aspects of flushing and should be handled as such. The physical and functional separation of these two aspects, or functions, and the effective and water-efficient handling of each independently (or together as required) form the basis of the present invention. The basic requirements of each function are: (1) use a minimum amount of water per cycle so that either function can still be performed properly as necessary, (2) offer an easy selection of the cycle activating means, (3) use a unique single part for activating either flushing cycle or operation mode, (4) provide some decision time to the toilet operator between the activation of either cycle, and (5) render the activation of flushing difficult for very small children.

These requirements can best be met if two water flushing systems are used and arranged to operate either simultaneously, sequentially and/or singularly, as selected by the operator. To that effect, the present invention incorporates a standard well known toilet bowl flushing system as illustrated in FIGS. 1 and 2, in which low pressure water is introduced in the toilet bowl in a manner such that said water performs the wall washing function most effectively. A separate high pressure water system operating in parallel, automatically injects a high velocity jet stream into the inlet of the water trap. Both the toilet bowl bottom and the trap are shaped and configured to optimize the jet pump expelling effect that is thus created when high pressure water is injected. A simple manually operated push-pull knob, as an example, allows the operator to select the type of flushing that is thought to be needed. Activation of both systems, either simultaneously or sequentially, by means of one single fool-proof part thus provides the logic required for mechanically selecting the flush mode deemed to be most suitable.

Basically, the preferred embodiments of the present invention then comprise: (1) a toilet bowl having walls internally shaped for minimizing the amount of water at rest in it and for facilitating the waste matter accumulation at its bottom, (2) means for introducing low pressure wash water near the toilet bowl top, (3) means for injecting high pressure water near the toilet bowl bottom to generate the jet pumping action, (4) a small toilet tank containing the washing water and the equipment required to actuate both flushings, (5) pipe connections from the toilet tank, and the flushing equipment therein, and the toilet bowl, (6) a standard flush valve system providing the low pressure water (which is not part of the subject improvement of the present invention), (7) a one-body high pressure automatic flush valve that monitors the expelling action of the high pressure water flushing, and (8) a mechanical linkage that connects the operator-actuated knob to both flushing systems, in a manner such that the manner in which the operator handles said knob automatically activates the proper flushing mode. The configuration of the toilet tank bottom, its attachment to and support by the toilet bowl, and the ducting and sealing of the water channel between toilet tank and toilet bowl are similar to those used in standard installations and well known. They need no further elaboration. The only major functional difference is that the water head $\Delta H$ required here for the low pressure water flushing system can be much smaller than that which is required of a standard toilet flushing system. Also, the volume of water needed to only wash the toilet bowl wall is much less. For these reasons, the toilet tank of the present invention is much less voluminous. Although the high pressure automatic flush valve is contained in the toilet tank, the volume of water it needs displace is only a fraction of the internal volume of a small toilet tank. The toilet tank wall provides the means for supporting and guiding the operator's flushing activation knob in the manner used for standard flushing systems.

The linkage mechanism inside the toilet tank connecting the operator's knob to the two flush valves is shown in the preferred embodiment of the present invention to comprise a rigid extensible link and a flexible non-extensible link chain. In FIG. 1, as knob 13 is pushed in the direction of arrow f, lever arm 12 is lifted. Linkage 16 first is also lifted, because spring 75 at rest exerts a compression force on plunger 71 appreciably larger than the compression force exerted by compression spring 67. This action causes pilot valve 60 to open. Link chain 15 has a total length such that it becomes taut only after spring 67 has been fully compressed tight. When this happens, if knob 13 is pushed further with a greater force, spring 75 becomes more compressed by plunger 71 and extensible linkage 16 is allowed to extend. When link chain 15 has reached the taut condition, a further push-in movement of knob 13 then causes flush valve 11 to be opened. It is important to understand that chain link 15 requires an appreciable increase of the pushing force exerted on knob 13 to become taut and activate flush valve 11. The total compression displacement permitted by spring 75 is larger than the travel required by chain link 15 to insure the completion of flush valve 11 full opening. As illustrated in FIG. 1, the leverage ratio provided by lever arm 12 causes the needed total resulting travel of plunger 71, relative to sleeve 72, to be much smaller than the amount of lift that link chain 15 must provide. In an alternate embodiment of the linkage configuration, knob 13 is located on top of the toilet tank and shown in phantom line as 30, in which case it is pulled (instead of pushed) in the direction of arrow f' to activate the flushing. Knobs 30 and 13 can both be provided, in which case another linkage embodiment alternative is also provided. In that instance, knob 30 is not connected to lever arm 31', but shaped to assume the configuration illustrated in phantom line in FIG. 1 and referred to as a. The lower end of arm a can be connected by another link chain c to flush valve 11, in which case flush valve 11 can be activated alone, independently from flush valve 10, for washing or rinsing the toilet bowl wall, without activating the high pressure water flushing. The dual operation provided by knob 13 and 30 can be combined in one knob (13 for instance) by using the rotation motion of the knob, in addition to its axial motion, to obtain the additional activation command means required to operate link chain c independently.

The water for the washing of the toilet bowl wall is channelled from the bottom of flush valve 11 to the upper part of the toilet bowl so that water reaches most of the toilet bowl wall internal surface. In FIG. 1, it is shown being introduced tangentially and against the back side. Injection tubes 25 and 25', in this illustration, are given a slightly different inclination so that the two slow velocity jets do not interfere but form two counterrotating sheaths of water flowing helically along the surface to be rinsed. Such an action maximizes the cleaning effectiveness of the washing water. Small holes located on the undersides of tubes 25 and 25' can also be made to provide additional washing water in those areas difficult to reach, as illustrated in FIGS. 1 and 2 by arrows q and p respectively. Water thus introduced at the top of the toilet bowl cannot efficiently flush the toilet bowl, which it is not intended to do in the present invention, and expel matter floating on the surface of the water residing at the bottom of the toilet bowl. This is the exlusive task of the jet pump effect earlier mentioned and discussed next.

In FIG. 2, the injection nozzle 24 axis is directed at the center of trap 5 entrance 26. Because of the interaction of the injected water jet with the surrounding mixture of still water and waste matter, the jet water slows down and the jet increases in cross-section until it reaches inlet 26. The size of this entrance is large enough to accomodate the jet passage and that of the expelled matter drawn along with jet 27, so that a restriction is not created. The size of this entrance cannot be too large either because it would lower the suction effect of jet 27. It is well known in the art of jet pumping that an optimum exit size exists for any combination of jet configuration and velocity for a given set of pumping characteristics and effectiveness, depending upon the nature of the matter to be pumped out. For the present application this optimum is determined by the following criteria: (1) an estimated amount of water and waste matter must be expelled over the top of the water trap, (2) the pumping must be completed within a few seconds, and (3) the amount of water required by the jet must be minimum. Also, the water trap cannot play its role unless its top (point e of FIG. 2) is located higher than point d (top of the trap entrance) and point d must be always located below lowest level d' of the rest water at the bottom of the toilet bowl. Furthermore, when the matter expulsion is completed, some water flows back from branch 30 of the trap into the toilet bowl bottom. There must be no matter left in that water. For this reason, the jet pumping capacity must be higher than the maximum based on the maximum amount of mixture of rest water and waste matter that may ever have to be handled. Whatever this amount of mixture is, it must do two things: (1) change direction (from that of the trap entrance horizontal centerline to that represented by line 29 of FIG. 2), and (2) travel up distance h. Therefore, angle $\alpha$ should be as large as possible to minimize that change of direction for a given value of h. However, the trap must fit between the toilet bowl and the wall. Another compromise is needed there because the length of branch 30 of the water trap should also be minimized. The value of angle α shown in FIG. 2 represents a good typical compromise and its influence is neglected in the analysis outlined below, as a first approximation.

Assuming that the pressure of the water delivered to high pressure automatic flush valve 10 is P, if ΔP is the total pressure drop between line 23 and nozzle 24, during a time T the water mass delivered in jet 27 is: $m = A \times \rho \times \sqrt{P - \Delta P} \times T/g$ where A is nozzle 24 discharge effective area, $\rho$ is the water density and g is the gravity constant. Assuming further that the mass of the water-mater mixture to be evacuated is M, the total mass to be expelled through the trap is $(m+M)$. The energy needed to lift this mass a height h is $g(m+M)h$. The momentum of the water jet is: $C \times A \times \rho \times (P - \Delta P) \times T/g$, where C is a constant; because the jet initial velocity can be expressed as: $C \times \sqrt{P - \Delta P}$. The momentum of the mixture entering the trap can be expressed as $(m+M)V'$ which must be equal or less than $C \times A \times \rho \times (P - \Delta P) \times T/g$. The mixture kinetic energy is then $(m+M)V'^2/2$ and must be higher than $g(m+M)h$ if the mixture is to pass over point e with some residual velocity, large enough to insure satisfactory flushing. Therefore: $(m+M)V'^2/2 > g(m+M)h$ or $V'^2 > 2gh$ (1). The conservation of momentum $(m+M)V' = C \times A \times \rho \times (P - \Delta P) \times T/g$ yields $V' = C \times A \times \rho \times (P - \Delta P) \times T/g(m+M)$, where $m = A \times \rho \times \sqrt{P - \Delta P} \times T/g$. Thus $V' = C \cdot \sqrt{P - \Delta P} \times m/(m+M)$ (2). $m/(m+M)$ can be replaced by $v/(v+V)$, as a rough approximation, because the matter to be expelled has a density close to that of water, with v and V being the total volumes of water injected by the water jet and of the mixture expelled out of the toilet bowl, respectively. If $v/V = k$, equation (1) can be reduced to $k/(1+k) > K\sqrt{h/(P-\Delta P)}$ (3) when $V'$ is replaced by its value given by equation (2). The constant K incorporates all other constants. Rearranging inequation (3) to express k directly yields:

$$k > K\sqrt{h/(P-\Delta P)} / [1 - K\sqrt{h/(P-\Delta P)}]$$

or $$v > V \times K\sqrt{h/(P-\Delta P)} / [1 - K\sqrt{h/(P-\Delta P)}] \quad (4).$$

V consists of 2 parts: (1) the water residing in the toilet bowl, and (2) the additional waste matter to be flushed. The first part depends on the toilet bowl and trap sizes and shapes. The second part is variable and unknown, but can be assumed to generally be much smaller than the first part, as a valid approximation, and can be ignored at this juncture.

The factor $K\sqrt{h/(P-\Delta P)}$ is small for all practical purpose, and the smaller it is, the smaller the ratio in inequation (4) $K\sqrt{h/(P-\Delta P)} / [1 - K\sqrt{h/(P-\Delta P)}]$ also is. For a given value of V, the smaller v can therefore be. The degree by which a practical value $v_p$ of v must exceed the value of the right side of inequation (4) is, as earlier stated, function of how effective the expulsion of the whole matter is wanted to be, of the very maximum amount of waste matter ever expected and of the extra safety desired. For simplicity sake, it is assumed that a factor F, greater than 1, can help dispose of this uncertainty. Then inequation (4) becomes: $v_p \geq V \times F K \sqrt{h/(P-\Delta P)}/[1 - K\sqrt{h/(P-\Delta P)}]$ (5), which is easier to analyze. One can then say that, everything else being equal:

1. The amount of high pressure water required to be injected is less if the amount of rest water in the toilet bowl is less;
2. The lower height h is, the smaller is the amount of high pressure water needed to be injected;
3. The injection nozzle size and the duration of the injection reflect the amount of water injected (AxT) but are unimportant as a first approximation, because volume ratios are more meaningful to use;
4. The higher the water pressure available, the smaller the water amount required for injection; and
5. The lower the pressure drop between the high pressure water supply line and the injection nozzle is, the smaller the amount of injected water needed.

Such conclusions are intuitively self-evident. However, inequation (5) shows the relative importance of the five factors listed above. The influence of h and P (for a given value of P) is not as simple expressed as that of V because of the square root and because of the seemingly compounding effect of the variations of $\sqrt{h/(P-\Delta P)}$ in inequation (5). However, referring back to FIGS. 1 and 2, two features and one requirement become more obvious: (1) a lower level of the water residing at the bottom of the toilet bowl such as d' is much better than d", (2) a decrease of volume V as provided by lines b representing the bottom of the front part of the toilet bowl is very beneficial, and (3) the injection flow of high pressure water should be stopped abruptly to prevent the rest water level in the toilet bowl from reaching e' which corresponds to the top of the trap. The requirement (3) applies only when the toilet bowl washing flush mode is not activated. If it is, the resulting rest water level is e' (or d") when the full dual flushing ends.

The operation requirements of high pressure automatic flush valve 10 are now defined, it must: (1) offer as little restriction as possible to the water flow, (2) automatically and abruptly shut the water flow off, (3) be easily adjustable to compensate for various pressure levels provided by different installations, (4) be compact, (5) not let water leak out when not in operation, to conserve water, (6) be reliable and always ready to operate in the same fashion, and (7) need no external power source to operate, except for its activation. The hereunder described operation of that valve as illustrated in FIGS. 3-4 and as depicted in the diagrams of FIGS. 6-8 explains how these requirements are fulfilled. When jet pump flushing of the toilet bowl is desired, knob 13 is partly pushed in. By means of extensible linkage 16, spring 67 is compressed and diaphragm 62 armature is pulled up. At that time, the pressures on each side of this diaphragm were the same (that which is inside the toilet tank). Pilot valve 60 is forced to open and high pressure water starts flowing out of volume Y'. Because of restricting orifice 65 in vent line 64, the water pressure then builds up in chamber X and further insures the full opening of valve 60. By then, the pushing action on knob 13 can be released if the operator is then certain not to need washing of the toilet bowl because the completion of the activated high pressure flushing is then ascertained automatically, from then on. Because of the presence of restricting orifice 44 in channel 42" (in series with restricting orifice 65 and valve 60), the water pressure in chamber Y immediately drops below the pressure in chamber Y" (lower side of diaphragm 36). Diaphragm 36 armature is forced upward and shuttle valve assembly 31 is pulled up until piston 34 is stopped at level O (open). Openings 38, 39, 40 and 40', that were previously closed, then open up. High pressure water is immediately allowed to flow from duct 8' to duct 23 and nozzle 24 to initiate the jet pumping action. High pressure water also flows through channel 41 to chamber Z and then out through venting channel 56. However, restricting orifice 57 ascertains that the pressure in chamber Z becomes and remains such that the net resulting force then acting on piston 53 pushes it upward. The characteristics of spring 54, restricting orifices 57, 44 and 65 are such that the displacement upward of piston 53 takes a time T, at the end of which piston 53 surface S reaches the inlet to channel 58. When this takes place, a series of events is initiated, as follows: (1) the flow into chamber X is stopped, (2) the pressure in chamber X becomes equal to that applied on the other side of diaphragm 62, (3) spring 67 pushes valve 60 to close (knob 13 must have been released by then, if the jet pump action is to be permitted to cease automatically), (4) the water pressures in chambers Y' and Y rise, (5) the pressures acting on each side of diaphragm 36 equalize (no flow through restricting orifice 44), (6) the balance of the various water pressures acting on piston 32, 33 and 34 causes the shuttle valve assembly to move downward, (7) as a result, openings 38, 39, 40 and 40' close, (8) the jet pump action ceases instantly, (9) the pressure in chamber Z drops immediately and piston 53 is pushed downward by the combined efforts of spring 54 and the pressure in chamber Y', and (10) high pressure is restored in chamber 59 and pushes on the lower part of the cone of valve 60, but on an area too small to compress spring 67, and the pilot valve stays closed until it is activated again (or knob 13 is still pushed).

At this juncture, several of valve 10 features begin to assume a vital role. The return velocity of piston 53 is restricted by the speed at which water can flow in chamber Y' through restricting orifice 44 and can flow out of chamber Z through restricting orifice 57. The truncated cone 90 starts entering opening 91 that leads to chamber 92 inside piston 53, at the end of its down-stroke. The passage offered to the water out of chamber 92 then decreases rapidly and piston 53 is prevented from hitting hard the bottom of valve 10 body 50 because of the action of the hydraulic buffer thus provided. Lower face 68 of piston 32 also comes in contact with seal 70 in position C of the shuttle valve (closed). Water leaks outside are thus prevented and the high pressure P is then applied on the area $\pi D^2/4$, if D is the effective diameter of seal 70. This creates the force required to keep the shuttle valve closed, although such force is small compared to the forces acting on diaphragm 36 when the high pressure automatic flush valve has just been activated.

The configuration and constitution of pistons 33 and 34 are such that they can play the roles of both shutoff valves and seals. High pressure openings 38 and 40 are opened and closed by the concurrent sliding actions of the lands of these pistons. These openings must close and open quickly and generate a pressure drop as small as possible when open. They are the source of high pressure water to valve 10. Openings 39, 40' and 69 are the only openings through which water leaking out of openings 38 and 40, and chamber Y'', could cause some leakage around the land of piston 34. Positive and friction-free sealing of openings 38 and 40, when closed, is not realistic to expect. It is more practical and reliable to assume that high pressure water will always manage to reach the spaces enclosed by pistons 34-33 and 33-32 and bore 35 wall. These pistons are attached to diaphragm 36 in a way such that they cannot rotate. They always present the same side of their lands to face openings 38, 39, 40 and 40'. Openings 39 and 40' can then be sealed, when closed, if those portions of pistons 33 and 34 lands covering them are made flexible and deformable. Chambers c' and c'' are thus always pressurized. As earlier described, circular seals 46 are constructed so that one half of their circularly shaped body is solid and the other half contain half-circular grooves 49 which permit lips 48 to deform outward when a pressure differential tends to make them bulge outward (see FIG. 9). The high pressures existing in chambers c' and c'' thus push lips 48 against the edges of openings 39 and 40' when they are closed, thus providing the selective positive sealing action of only one side of pistons 33 and 34 as required. The rigidity of the other half of seals 46, without grooves 49 and lips 48, insure an adequate closing of openings 38 and 40 when pistons 33 and 34 are in their lower positions. All openings into bore 35, specially 39 and 40', have their edges carefully rounded off to prevent any damage to lips 48 when the shuttle valve assembly slides up and down or rests in the down position for long periods of time. Because the shuttle valve has only two set positions, up or down, valve fluttering and jetting side effects on pistons 33 and 34 of the water flowing through openings 38 and 40 are non-existant. The wear and sealing ability of lips 48 are thus kept at their optimum.

Because water is used to operate several essential components and must flow through small restricting orifices that must be prevented from becoming clogged or otherwise obstructed, the high pressure water used as servofluid and coming out of duct 8' must be free of small particles and gummy matter. Filter 43 located on channel 42 performs that function. Though only schematically shown in FIG. 3, it is accessible from the outside of valve 10 and removable by means and in a manner well known in the art which needs no further elaboration. This filter can thus be inspected, cleaned, replaced and/or otherwise serviced periodically or as required. FIG. 4 shows a cavity 99 in phantom lines, open to the outside of valve body 50, which permits such access. The details of the filter sealing and securing components are also well known to anyone familiar with the art.

All restricting orifices are also accessible for inspection, cleaning and replacement as needed from the outside of valve body 50. They are connected, mounted and sealed also by means and in ways familiar to persons versed in the art. The adjustable size restricting orifices incorporate a pointed end screw, with a head easily accessible from the outside of valve body 50, that can be pushed in or pulled out to vary the size of the orifice in the manner well known in the art.

The graphs of FIG. 6 indicate how the water pressure levels vary at various locations throughout the high pressure automatic flush valve during piston 53 stroke. At rest, when no flow comes out of both openings 39 and 40' (piston 53 down), if the pressure inside duct 8', chambers Y, Y', Y'', c', c'' and 59 is P and the pressure inside chambers Z, X and X' is L (pressure of the water in the toilet tank near its bottom), the various pressures at various locations during any movement of piston 53 have values between P and L. When servoflows occur, the pressure drops through the various restricting orifices are deemed to be much larger than the pressure losses along the channels and their openings into and out of the various chambers mentioned earlier. Pilot valve 60 must be small to minimize the influence of pressure P when the valve is closed as earlier discussed and its seat orifice is small. A small pressure drop δP is assumed to be generated by its flow-restricting effect when valve 60 is wide open. As soon as water starts fully flowing, the supply water pressure drops a value δP' and the total amount of pressure differential available between the ends of a full length of either servofluid channel is then (P - L - δP') as shown in FIG. 6. The pressure losses created along the channels themselves by the servoflows are negligible. Curve 1 corresponds to the channel route starting from filter 43 on FIG. 3 and going through chambers Y, Y', 59 and X'. Because of the flow restrictions presented by the openings between chambers Y' and 59, a small pressure drop δP" is also assumed to occur between Y' and 59. The other servoflow channel route 41 and 56 is simpler to visualize and the sum of the two pressure drops through 41 and 56 exhibited by curve 2 is (P - L - δP'). Because channel 41 is long and opening 40' is small, a small pressure drop "41", much smaller than the pressure drop through restricting orifice 57, is also assumed to take place. If needed, an adjustable restricting orifice 98 can also be inserted in channel 41 to provide another means for compensating for variations of P between various toilet installations. Its pressure drop is included in "41" of curve 2. Because piston 53 motion affects the amounts of water flows along the various servoflow channels, the pressure drops across the various restricting orifices are different during the upstroke and the downstroke of piston 53. In the first instance, the volume of chamber Y' decreases and the volume of chamber Z increases. That process reverses itself during the second instance (piston return or downstroke). During piston 53 upstroke, pressure drops "65" and "41" exist (curves 1 and 2), but during the downstroke, these pressure drops no longer exist and only branches "44" and "57" of curves 1 and 2 remain. The levels of the pressures existing in chambers Y' and Z depend upon the force exerted by spring 54, the friction forces developed by seal 55 and the servoflows through restricting orifices 44 and 57, as established by the velocity of piston 53. Points 44' of curve 1 then drops down to point 44" for instance and point 57' of curve 2 drops down to point 57". During piston 53 upstroke, point 44' is lower than point 57', but the situation reverses itself during piston 53 downstroke (point 44" is then higher than point 57"). The end results are: a net force exerted on piston 53 directed upward in the first instance (upstroke), and a net force directed downward in the second instance (downstroke). For the sake of clarity and simplification, the pressure transients taking place when piston 53 reaches the ends of its upstroke and downstroke are omitted as unimportant.

Once the operations of the various restricting orifices and of their relations with the motion of piston 53 have been understood, the motions of valve 60, shuttle valve 31 and piston 53, and their temporal relationships can easily be described. The pressure variations in chambers X, Y (or Y') and Z can also be graphically outlined. The graphs of FIG. 7 relate all these variables to time used as a common denominator. In graph I, the net force acting on piston 53 varies from +F to −F. By convention, it is positive when directed upward. If at rest spring 54 exerts a force −ΔF, it is quickly overcome, as soon as valve 60 is opened (position O of graph II). Concurrently and as a consequence, the pressure in chamber X climbs, a pressure drop is generated across restricting orifice 44 and pressure in chamber Y drops. Diaphragm 36 pulls shuttle valve 31 upward (graph V) and causes openings 38, 39, 40 and 40' to become open. The jet pump action is initiated and the pressure in chamber Z builds up, as shown in graph III. It reaches a level higher than the pressure existing in chamber Y'. This causes piston 53, after an average time delay ΔT (graph IV), to start its upstroke (curve p). Because of the slow compression of spring 54 then taking place, the net force acting on piston 53 decreases slightly (graph I). At time $\tau_o$, piston 53 surface S reaches the opening of channel 58 which then becomes closed. A brusque pressure level reversal then occurs. The pressures in chambers 59 and X become equal to L (venting). Pilot valve 60 closes. The pressure drop through restricting orifice 44 becomes almost nil. A pressure surge in chamber Z (time δt) is generated. This causes diaphragm 36 to push shuttle valve 31 downward. Openings 40, 40', 38 and 39 close. The jet pump action ceases and the pressure in chamber Z sinks abruptly. The net force applied on piston 53 reverses its direction, exceeds $\{-\overline{F}\}$ because spring 54 is fully compressed. Piston 53 begins its downstroke and, at time τ, reaches the bottom of chamber Z. The influence of hydraulic buffer 90 can be ignored. Depending upon the size of restricting orifice 65, for any fixed size of restricting orifice 44, the level of the pressure in chamber Y' can be caused to reach values such that the new force acting on piston 53 causes it to move either faster or slower (curves 1 and 2 of graph IV), thereby adjusting T to values such as $T_1$ and $T_2$, during which the jet pump is operating. This allows the adjustment of the total volume of water injected by nozzle 24. Adjusting restricting orifice 57 size allows the return duration of piston 53 downstroke to vary in a similar fashion.

FIG. 8 indicates how the water flows into the toilet bowl. Curves p, 1 and 2 correspond to curves p, 1 and 2 of graph IV in FIG. 7. Curve W represents the flow of the water coming out of the toilet tank and entering the toilet bowl, if and when knob 13 of FIG. 1 is pushed harder and further in order to activate flush valve 11, at any time τ', which must be smaller than time $\tau_o$. The washing water flow so created may be at a rate slower than that generated by nozzle 24. If knob 13 is fully pushed after time $\tau_o$, valve 60 reopens and a partial-to-full cycle of the jet pump operation is then reinitiated. The operator has until time $\tau_o$ to decide whether to use the washing mode then, if a single activating knob is used to activate both flushing modes. The washing cycle lasts longer than the jet pump action and the total amount of water it delivers (area under curve W) can be much larger than the amount of water injected by nozzle 24 (area under curve p).

Time $\tau_o$ is typically set at a few seconds (e.g.: 4 to 6) so that the operator has time to observe the expelling and cleaning actions of the jet pump flow, and to decide then whether to use the additional washing mode, or to repeat the jet pumping cycle. The washing cycle is long enough (several seconds, e.g.: 10 to 15) to allow the operator the time for brushing and/or scrubbing the toilet bowl wall surface, if necessary, during that washing cycle. Such a washing/scrubbing cycle can be then followed by a second high pressure flush. If and when an alternate activating mechanism such as that shown actuated by knob 30, lever arm a and chain c is available to operate the flush valve, a jet pump action activation needs not be first initiated and the toilet bowl washing mode only can be activated. Such an activation sequencing and/or timing can only be obtained when means is available for activiting the flush modes independently.

As illustrated in FIGS. 1 and 2, the bottom volume of the toilet bowl consists of the volume between level d' and surface b, and of a small confined receptacle located between nozzle 24 and trap entrance 26. Its width (FIG. 1) can be narrow, thereby minimizing its volume. Surface b can be made to slope toward said receptacle to: (1) facilitate the sliding of waste matter into the receptacle, and (2) minimize that volume between water level d' and surface b. The toilet bowl wall washing function does not require high water velocities, because satisfactory removal of sticky matter requires a more effective action such as scrubbing or brushing. Because this water performs no flushing per se, a small amount is needed. The manner in which it is distributed evenly on the internal surface of the toilet bowl wall is more important than either velocity or amount. An alternate way to introduce this washing water in the toilet bowl is to replace tubes 25 and 25' by a continuous tube forming a ring around and inside the toilet bowl rim. Small holes directing small water jets downward against the toilet bowl wall as shown by arrows q of FIG. 1 and p of FIG. 2 then provide such an effective water distribution.

Inequation (5) demonstrates the importance of h, P, $\Delta P$ and V if $v_p$ is to be minimized. P could be 60 psig, $\Delta P$ can be held at 10 psig and h is about 5–6 inches (or $\frac{1}{2}$ psig), which gives a value of 0.1 to $\sqrt{h/(P-\Delta P)}$. Practical values for F and K are 1.5 and between 1.5 and 2.0, respectively. The ratio $v_p/V$ has a value between 0.265 and 0.375, or approximately $\frac{1}{3}$. Lowering pressure P to 45 psig and increasing $\Delta P$ to 13 psig, keeping the same values for F and K, yield 0.346 and 0.5, or approximately less than $\frac{1}{2}$. Therefore, it is realistic to assume that the jet pumping action requires less than half of the volume of mixture to be evacuated from the toilet bowl. As the earlier discussion indicates, this volume can be realistically less than 1 gallon. The high pressure water volume needed is at the most $\frac{1}{2}$ gallon and a washing water volume of $\frac{1}{2}$ gallon should be ample. A dual flushing cycle (both modes) can be accomplished with less than 1 gallon. Even if a second high pressure flush cycle is used, the total amount of water expended is then only $1\frac{1}{2}$ gallon as compared to the usual 4 to 5 gallons. The potential water saving earlier discussed is therefore very tangible. It was mentioned that the extra hardware required should cost less than $100.00 to render this new flushing method economically appealing. The extra hardware required, if comparison is made with a flushing system that incorporates only the low pressure flushing apparatus, consists of the high pressure automatic flush valve, the extensible slip (or step) linkage and possibly two or three pipes and/or ducting connections. Except for the springs that must be made of stainless steel to keep their characteristics, the construction of all components of that valve assembly is state-of-the-art and it is easy to mass produce. The retail price of the additional high pressure flushing apparatus, installed on a toilet assembly designed to receive it, can easily be kept under that critical value of $100.00 earlier mentioned.

It is thought that the dual flush toilet apparatus, and the method used for its aplication, of the present invention and many of its attendant advantages will be understood from the foregoing description and it will be apparent that various changes may be made in the form, construction and arrangement of the parts thereof without departing from the spirit and scope of the invention or sacrificing any of its material advantages, the form hereinbefore described being merely a preferred or examplary embodiment thereof. These advantages are: (1) a more flexible flushing better adapted to the requirements of toilet operation, toilet bowl washing and waste matter evacuation independently; (2) an appreciable saving of potable water, or water conservation; (3) a sizable economic saving over the lifetime of the toilet; (4) a smaller and less voluminous toilet tank, easier to make more esthetically appealing; and (5) a flushing system made more difficult to play with, for very small children.

Having thus described my invention, I now claim:

1. A dual flush toilet including a toilet bowl having a small confined receptacle at its bottom and shaped for receiving waste matter therein, a toilet tank connected to the toilet bowl and to means for supplying water at high pressure, a water trap for preventing gases and waste matter from flowing back into the toilet bowl after flushing and shaped to minimize the amount of kinetic energy required to expel the mixture of waste matter and water present in the toilet bowl, means for introducing water from the toilet tank into the toilet bowl at low pressure and low velocity at the top of said toilet bowl, means for injecting water under high pressure and at high velocity at the bottom of the toilet bowl, means for selectively monitoring the introduction of low pressure water and the injection of high pressure water, said means being supported by and contained in the toilet tank, a waste matter evacuation duct connected the water trap, means for securing the toilet tank to the toilet bowl, means for securing the toilet bowl to a supporting floor, a flush valve directly connecting the toilet tank to the toilet bowl, means for automatically regulating the water level in the toilet tank, means for manually operating the flush valve, wherein the means for injecting the high pressure water is positioned opposite to the water trap entrance so as to create a jet pump effect and wherein the low pressure water is introduced at the top of the toilet bowl and distributed around the toilet bowl wall internal surface, and further including a high pressure automatic flush valve having an inlet pipe for receiving the supply of high pressure water, an outlet pipe for ducting the high pressure water from said valve to the high pressure water injecting means and means for initiating the operation of said valve, said high pressure automatic flush valve further comprising:

a spring-loaded pilot valve activated by the means for selectively monitoring the injection of high pressure water;

a diaphragm-actuated shuttle valve acting as a shutoff valve for controlling the passage of water through the high pressure automatic flush valve to the high pressure water injecting means and to servoflows of water as needed for rendering the operation of the high pressure automatic flush valve automatic;

a spring-loaded piston for controlling the timely closings of the pilot valve and of the shuttle valve, said piston being equipped with a sliding seal located on its sliding land;

a cylinder in which said piston travels in both directions, upward and downward, the end walls of said cylinder and of said piston thus forming two sealed closed chambers through which two servoflows are ducted, one servoflow through each of said chamber;

a set of channels, equipped with a plurality of restricting orifices being located in a manner such that the amount of water flowing through said restricting orifices establishes the pressure levels in said chambers, and having sizes relatively to each other's such that said water pressure levels thus determine the net force exerted on the piston, for ducting the servoflows;

a spring-loaded diaphragm connected to the pilot valve, located between two enclosed spaces, the upper space being vented to the toilet tank, and the lower space being connected to the servoflow channel leading to the pilot valve;

a diaphragm connected to the shuttle valve positioned between two closed volumes, the upper volume being connected to the upper chamber formed by the piston and its associated cylinder by the servoflow channel leading to the pilot valve; and a body for holding the positioning all of the high pressure automatic flush valve components above recited in a manner such that the spring-loaded piston automatically closes the servoflow channel leading to the pilot valve when said piston reaches the end of its upwardly directed stroke.

2. A dual flush toilet as recited in claim 1, wherein said piston, by closing the servoflow channel to the pilot valve at the end of its upward stroke, causes the water pressures acting on both sides of the pilot valve diaphragm to equalize and become the same as that pressure of the water inside the toilet tank, thereby enabling the spring located on the upper side of the pilot valve diaphragm to force the pilot valve to close.

3. A dual flush toilet as recited in claim 2, wherein the pilot valve which is made to close by the piston at the end of its upstroke provides the means for causing the water pressure differential across said piston to reverse its direction, thereby forcing the piston to initiate its downward stroke and to return to its initial rest position.

4. A dual flush toilet as recited in claim 1, wherein the diaphragm operated shuttle valve includes:

three co-axially arranged pistons sliding inside and guided by a single cylinder;

two sets of diametrically opposed openings cut into the wall of said cylinder and which can be opened and closed by said pistons, one set of said diametrically opposed openings being used to monitor the total amount of servoflow water, the other set of said diametrically opposed openings being used to monitor the flow of high pressure water that is ducted to the high pressure water injecting nozzle; and means located on said pistons and in said associated cylinder for sealing those openings cut in said associated cylinder that are connected to the outgoing servoflow channel and to the high pressure water outlet pipe leading to the injection nozzle, when those openings are closed, thereby preventing water leakage externally to the high pressure automatic flush valve when it is not operating.

5. A dual flush toilet as recited in claim 1, wherein the body of said high pressure automatic flush valve further comprises:

means for providing a hydraulic bumper for smoothly arresting the spring-loaded piston at the end of its downstroke; and means for filtering the servoflow water before said water enters and passes through the restricting orifices, said filtering means being accessible from the outside of said high pressure automatic flush valve and removable for inspection and replacement when necessary during the lifetime of the toilet.

6. A dual flush toilet as recited in claim 1, wherein the restricting orifices are accessible from the outside of the high pressure automatic flush valve and their connecting and fastening means includes:

means for removing said restricting orifices for inspection and replacement as needed during the toilet lifetime; and means for adjusting the size of said restricting orifices, whereby the spring-loaded piston velocity can be adjusted by access means external to said valve, thereby providing the means for adjusting and setting the durations of said piston upstroke and downstroke independently.

7. A dual flush toilet as recited in claim 6, wherein the means for independently adjusting and setting the durations of the spring-loaded piston upstroke and downstroke can also be used for:

compensating for variations of pressure of the high pressure water supply existing between various toilet installations; and adjusting and setting the amount of water admitted to the injection nozzle through the high pressure automatic flush valve during the upstroke of the spring-loaded piston.

8. A dual flush toilet as recited in Claim 7, wherein a single activating means is provided for monitoring the introduction of low pressure water in the toilet bowl through the flush valve connecting the tank to the toilet bowl and the injection of high pressure water through the high pressure automatic flush valve, said single activating means being constructed and linked to both valves so as to allow the choice by a toilet operator of:

first, flushing only by means of the high pressure automatic flush valve;

second, flushing by means of the high pressure automatic flush valve followed by a subsequent flushing by means of the low pressure flush valve; and waiting after activating the operation of the high pressure valve before activating the operation of the low pressure flush valve, thereby giving the operator the opportunity to observe the effectiveness of the high pressure flushing before deciding whether a subsequent low pressure flushing is warranted.

9. A dual flush toilet as recited in claim 7, wherein the monitoring of the flush valves is achieved for each individual valve by separate monitoring means, whereby a choice is given to a toilet operator of selecting either one of two flushing modes according to the type and degree of flushing deemed most appropriate by the operator for the occasion.

10. A dual flush toilet as recited in claim 7, wherein the monitoring means for activating the high pressure automatic flush valve is constructed and arranged for allowing:

an extension of the duration of the high pressure flushing beyond the automatically set duration of said flushing by further holding the monitoring means in its activating position; and the subsequent activation of the low pressure flushing as is deemed required by a toilet operator.

11. A dual flush toilet as recited in claim 8, wherein the single activating means for monitoring the toilet flushing and controlling its timing sequence comprises:

a first linkage connected to the pilot valve of the high pressure automatic flush valve;

a second linkage connected to the low pressure flush valve, and connected in parallel with the first linkage; and means for establishing two distinct levels in the amount of effort needed to operate the linkages, a low effort level for activating the pilot valve and a higher effort level for activating the low pressure flush valve;

whereby the selection of the toilet operation mode is facilitated and rendered unequivocal to an untrained operator, while making it more difficult for a small child to activate the low pressure flushing.

12. A dual flush toilet as recited in claim 11, wherein the possibility of unequivocally selecting the flushing mode most suitable for the flushing then required allows the operator to adjust the amount of water used per flushing to the lesser amount needed at will, thus enabling the operator to save and conserve water.

13. A high pressure automatic flush valve for delivering determined volumes of water at pressure levels varying from quasi ambient pressure to near the pressure level at which the water is supplied to said valve, said volumes of water being established concomitantly by the size of a discharge nozzle through which the water is delivered by the valve, and comprising:

an inlet duct for connecting to a pressurized water supply;

an outlet duct for connecting to the discharge nozzle;

means for monitoring the valve operation and located externally to the valve and linked thereto;

a pilot valve activated by the monitoring means;

a diaphragm-actuated shuttle valve acting as a shutoff valve for controlling the passage of water through the high pressure automatic flush valve to the nozzle and to a plurality of servoflows having the function of rendering the operation of the flush valve automatic after its operation has been activated;

displacement means positioned between two opposite sealed chambers through which the servoflows are channelled, one servoflow through each chamber, and having a fixed length stroke;

a plurality of channels for ducting the servoflows, each channel housing a restricting orifice, said restricting orifices being positioned in its respective channels in a manner such that the amounts of servoflows allowed to pass through their respective restricting orifices determine the forces acting on the displacement means located between the two chambers;

means for causing the displacement means to interrupt one of the servoflows automatically at the ends of its stroke, thereby establishing a set time duration;

a spring-loaded diaphragm connected to the pilot valve and positioned between two enclosed spaces, one space being vented to ambient pressure and the other space being connected to the servoflow channel leading to the pilot valve;

an actuating diaphragm connected to the shuttle valve and positioned between two enclosed volumes, one volume being connected to one of the chambers by a channel containing a restricting orifice, the other volume being connected to a channel leading to the pilot valve through the other chamber; and a body for housing and positioning all the components recited above in a manner such that the displacement means automatically closes the servoflow channel leading to the pilot valve when said displacement means reaches the end of the first leg of its stroke where is triggers the return leg of its stroke and the shutting off action of the shuttle valve, at the end of which the displacement means is automatically reset for the next flushing cycle.

14. A high pressure automatic flush valve according to claim 13 located in the tank of a toilet and connected in parallel with a flap flush valve venting into a toilet bowl, the outlet duct of the high pressure automatic flush valve being connected to the bottom of the toilet, the inlet duct of the high pressure automatic flush valve being connected to a water supply for the toilet, both valves being connected by parallel linkages to monitoring means for activating each flush valve separately and unequivocally, wherein the automatic flush valve discharge nozzle faces the entrance of a water trap connecting the toilet bowl to an evacuation pipe, thereby creating a water jet pump effect which can be used most effectively for evacuating the toilet bowl, and wherein the toilet tank houses means for keeping it filled with water to an established level, and which further includes:

means for selecting a chosen singular flushing mode;

means for adjusting the duration of the jet pump operation beyond a set period of time, whenever deemed justified;

means for activating the flap flush valve operation at any time during the jet pump operation, whereby low pressure water is thus introduced from the toilet tank into the toilet bowl; and means for activating the flap flush valve operation independently of the automatic flush valve operation.

15. A high pressure automatic flush valve according to claim 14, wherein the low pressure water is introduced at the top of the toilet bowl and along the internal surface of the wall thereof so as to wash and rinse said surface as and when deemed required by a toilet operator.

16. A high pressure automatic flush valve according to claim 13, wherein the amount of water delivered by the valve during each flushing cycle can be adjusted by changing the size of the restricting orifices in the servoflow channels, for any given level of the high pressure water supply, thereby providing the means to compensate for variations in pressure of said water supply.

17. A high pressure automatic flush valve according to claim 13, wherein the amount of water delivered by the valve during each flushing cycle, for any given pressure level of the high pressure water supply and any given size of the discharge nozzle, can be adjusted by changing the size of the restricting orifices in the servoflow channels.

18. A high pressure automatic flush valve according to claim 13, wherein the displacement means comprises:

a free piston sliding inside a cylinder and forming the two opposite sealed chambers in cooperation with two end closures positioned at the end of said cylinder;

a compression spring acting on the piston and located in the chamber through which the servoflow controlled by the pilot valve circulates;

a sliding seal positioned between the piston and the cylinder and located on the piston side; and a hydraulic buffer for slowing down the piston motion at the end of its return stroke.

* * * * *